United States Patent [19]

Delvin et al.

[11] Patent Number: 4,990,549

[45] Date of Patent: Feb. 5, 1991

[54] GLASS FIBER REINFORCED POLYESTER MOLDING COMPOUND WITH IMPROVED PHYSICAL STRENGTH PROPERTIES

[75] Inventors: Ann M. Delvin; Robert R. Gallucci, both of Mount Vernon; Keith N. Gray, Newburgh, all of Ind.; Ronald M. Harris, Coral Springs, Fla.

[73] Assignee: General Electric Company, Pittsfield, Mass.

[21] Appl. No.: 421,581

[22] Filed: Oct. 16, 1989

[51] Int. Cl.$^5$ .................................................. C08K 9/04
[52] U.S. Cl. .................................... 523/209; 523/213; 523/214; 523/217; 523/466; 524/605
[58] Field of Search ............... 523/209, 217, 213, 214, 523/466; 524/605

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,368,995 | 2/1968 | Furukawa | 260/40 |
| 3,671,487 | 6/1972 | Abolins | 260/40 |
| 3,814,725 | 6/1974 | Zimmerman et al. | 260/40 |
| 3,962,174 | 6/1976 | Berardinelli | 260/40 |
| 4,113,692 | 9/1978 | Wambach | 260/40 |
| 4,124,561 | 11/1978 | Phipps, Jr. et al. | 260/40 |
| 4,276,208 | 6/1981 | Ogawa et al. | 260/28 |
| 4,394,475 | 7/1988 | Temple et al. | 524/262 |
| 4,487,797 | 12/1984 | Watson | 428/268 |
| 4,539,350 | 9/1985 | Abeelen et al. | 523/527 |
| 4,568,712 | 2/1986 | Van Abeelen et al. | 524/267 |
| 4,711,924 | 12/1987 | Salensky | 524/402 |
| 4,745,028 | 5/1988 | Das et al. | 428/391 |

FOREIGN PATENT DOCUMENTS

| | | |
|---|---|---|
| 53106749 | 1/1969 | Japan. |
| 53106750 | 1/1969 | Japan. |
| 53143649 | 7/1969 | Japan. |
| 53144954 | 7/1969 | Japan. |
| 53144955 | 7/1969 | Japan. |
| 7325066 | 5/1989 | Japan. |
| 1592205 | 7/1981 | United Kingdom ............ 67/2 |
| 1592668 | 7/1981 | United Kingdom ............ 3/34 |

*Primary Examiner*—Joseph L. Schofer
*Assistant Examiner*—John J. Guarriello
*Attorney, Agent, or Firm*—Hedman, Gibson, Costigan & Hoare

[57] ABSTRACT

Polyester resins modified with a glass fiber reinforcing agent treated with novel sizing agents exhibit marked by improved physical strength properties.

33 Claims, No Drawings

GLASS FIBER REINFORCED POLYESTER MOLDING COMPOUND WITH IMPROVED PHYSICAL STRENGTH PROPERTIES

The present invention relates to polyester resins modified with a glass fiber reinforcing agent. More specifically, it relates to polyester resins modified with a glass fiber reinforcing agent treated with a triglycidyl isocyanurate sizing agent having improved physical strength properties.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539. These patents disclose that the polyesters are particularly advantageous as film and fiber formers.

Such polyesters have not been widely accepted for use as molding resins, however, until only fairly recently, because of their relative brittleness in thick sections when crystallized from the melt. This problem was overcome by varying the crystal texture, e.g. by using two-step molding cycles or including nucleating agents, and by molecular weight control. This permitted the marketing of injection moldable poly(ethylene terephthalates) which typically, in comparison with other thermoplastics, offered a high degree of surface hardness and abrasion resistance, and lower surface friction.

Simultaneously with the development of injection molding grades of polyester resins, fiber glass reinforced compositions were also provided. See Furukawa et al, U.S. Pat. No. 3,368,995 and Zimmerman et al, U.S. Pat. No. 3,814,725. These injection moldable compositions provided all of the advantages of unfilled polyesters and, also, because of the glass reinforcement had higher rigidity, yield strength, modulus and impact strength.

Pristine, or sizing free, glass fibers have been disclosed as reinforcing agents in Abeleen et al, U.S. Pat. No. 4,539,350 and Abeleen et al, U.S. Pat. No. 4,568,712. These two patents teach the addition of a polysiloxane compound to improve the ductility of the polyester resins.

Conventional starch based sizings have been disclosed in the prior art. Abolins, in U.S. Pat. No. 3,671,487 teaches the use of lightly sized or unsized glass fibers in preparing flame and drip retardant glass reinforced polyester resins. Wambach, in U.S. Pat. No. 4,113,692 employs conventional sized glass fibers and polycarbonate resins to increase resistance to warpage in poly(1,4-butylene terephthalate) and poly(ethylene terephthalate) resin blends. Similarly, warp resistant polyesters with glass filaments in combination with talc or mica fillers are disclosed in United Kingdom Pat. Nos. 1,592,205 and 1,592,668, but sizings are conventional and are either optional or lightly employed.

Non-starch aqueous sizings for treating glass fibers are disclosed in Temple et al, U.S. Pat. No. 4,394,475. The patentee therein teaches a sizing composition comprising a non-starch film forming polymer, a polyethylene containing polymer and a wax which improves the slip/flow characteristics of the glass fibers.

Epoxy coated glass fibers to reinforce polymer materials are disclosed in Watson, U.S. Pat. No. 4,487,797 and Das et al, U.S. Pat. No. 4,745,028. Watson teaches an aqueous chemical composition comprising a water dispersible, emulsifiable or soluble epoxy novolac film forming polymer in combination with a glass fiber coupling agent and a poly(oxyalkylene-oxyethylene)polyol copolymer as the sizing agent. Das et al, teach a sizing composition which comprises an aqueous epoxy polyurethane with blocked isocyanate crosslinking groups and at least one or more organo coupling agents. Ogawa et al, U.S. Pat. No. 4,276,208 describe polyester resin compositions having glass fibers surface coated with an epoxy compound having at least two epoxy groups in the molecules such as bisphenol-A type epoxy compound, bisphenol-F type epoxy compound and novolac type epoxy compound, in combination with a salt of a montan wax.

None of the above patents contemplate the use of a sizing agent comprising a di- or tri- functional cyanurate or isocyanurate to impart reinforcement on polyester resins. Unexpectedly it has now been found that thermoplastic resin compositions comprising a polyester resin and a glass fiber reinforcing agent treated with a sizing agent comprising a di- or tri-functional cyanurate or isocyanurate surprisingly exhibit a marked increase in physical strength characteristics such as tensile strength, flexural strength and unnotched and notched impact strength over polyester resins treated with the prior art reinforcing agents.

Also to be mentioned is Japanese Pat. No. 73/25066 (See Chemical Abstracts 80,1974-134460k) which discloses increasing the bonding strength between poly(vinyl chloride) and silane-treated glass fiber reinforcement by treating a glass fiber roving with 3-aminopropyltriethoxysilane and triglycidyl isocyanurate. No mention, however, is made of using such treated glass fibers with polyesters or the surprising improvements in physical strength characteristics polyesters exhibit when treated with glass fibers sized with the disclosed compound.

Di- and tri- functional isocyanurates are disclosed in combination with glass reinforced polyester compositions in Japanese Pat. No. 53/144954 (Chem. Abs. 90(18):138661f); Japanese Pat. No. 53/144955 (Chem. Abs. 90(24):187948p); Japanese Pat. No. 53/143649 (Chem. Abs. 90(18):138625d); Japanese Pat. No. 53/106750 (Chem. Abs. 90(6):39670b); and Japanese Pat. No. 53/106749 (Chem. Abs. 90(4):24261v). It is believed, however, that the di- and tri-functional isocyanurates are employed as crosslinking agents in the polyester resins and not as novel sizing agents for the glass fiber reinforcing agents which provide unexpected marked increases in the physical strength of the polyester resins surprisingly found herein.

SUMMARY OF THE INVENTION

According to the present invention there is provided a thermoplastic resin composition comprising: (a) a polyester resin; and (b) a glass fiber reinforcing agent treated with a sizing agent comprising a di- or tri- functional cyanurate or isocyanurate. Preferably the polyester resin comprises a poly(ethylene terephthalate), a poly(1,4-butylene terephthalate), a poly(1,4-cyclohexanedimethanol terephthalate) or a mixture thereof. The preferred sizing agent is triglycidyl isocyanurate. Also according to the present invention there is provided the above-identified composition in further combination with an effective amount of a nucleating agent and/or a flame retardant agent. Preferably sodium benzoate is employed as the nucleating agent.

DETAILED DESCRIPTION OF THE INVENTION

Component (a) of the present invention comprises polyester resins. Polyesters generally for use herein are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeated units of the following general formula:

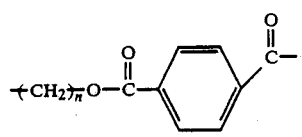

wherein n is an integer of from 2 to 6. The most preferred polyesters are poly(ethylene terephthalate) and poly(1,4-butylene terephthalate).

Also contemplated herein are the above polyesters with minor amounts, e.g., from 0.5 to about 5 percent by weight, of units derived from aliphatic acid and/or aliphatic polyols to form copolyesters. The aliphatic polyols include glycols, such as poly(ethylene glycol). All such polyesters can be made following the teachings of, for example, U.S. Pat. No. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

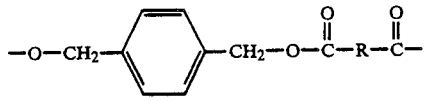

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, etc, and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

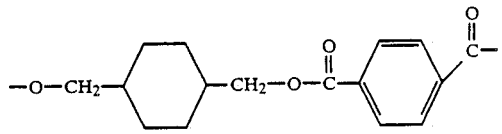

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the formula:

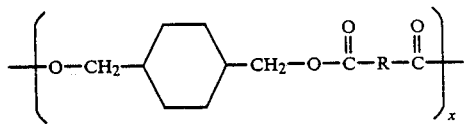

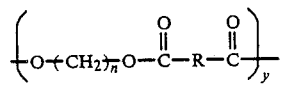

wherein the cyclohexane ring is selected from the cis- and trans-isomers thereof, R is as previously defined, n is an integer of 2 to 6, the x units comprise from about 10 to about 90 percent by weight and the y units comprise from about 90 to about 10 percent by weight.

Such a preferred copolyester may be derived from the reaction of either the cis- or trans- isomer (or mixtures thereof) of 1,4-cyclohexanedimethanol and ethylene glycol with terephthalic acid in a molar ratio of 1:2:3. These copolyesters have repeating units of the following formula:

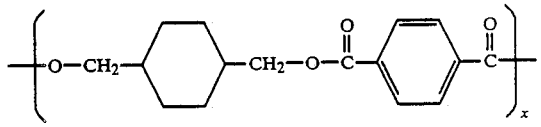

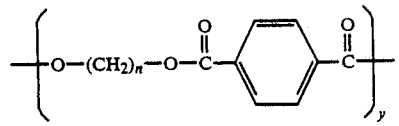

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol/tetrachloroethane mixture or similar solvent at 23°–30° C.

The filamentous glass to be employed in reinforcing agent (b) in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass. ever, other glass compositions are useful. All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 0.00012 to about 0.00075 inch, but this is not critical to the present invention. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur.

Essential to the present invention is that the glass fibers are treated with a sizing agent comprising a di- or tri-functional cyanurate or isocyanurate.

The glass fiber coating may optionally contain other materials to improve bonding of the di and tri cyanurates and isocyanurates to the glass fiber. Functionalized silanes especially alkoxy silanes may be useful in this regard. Illustrative are aminopropyl triethoxy silane, glycidyl propyl trimethoxy silane, (3,4-epoxy cyclohexyl) ethyl triethoxy silane, mercaptopropyl silane, aminoethyl aminopropyl alkoxy silane and uredio-alkyl triethoxy silanes. Most preferred are aminopropyl triethoxy silane and glycidylpropyl triethoxy silane.

The di and tri cyanurates and isocyanurates may also be functionalized with any group capable of chemically bonding to the polyester resin. The preferred isocyanurate and cyanurate functionalization are epoxy groups. For example glycidyl, epoxy propyl and epoxy cyclohexyl. The most preferred sizing agent contains triglycidyl isocyanurate (TGIC).

The functionalized cyanurate or isocyanurate, the functionalized silane and the glass fiber are thought to chemically react during the coating and annealing process to give the modified glass fibers of the invention. However, the inventors do not wish to be bound by any theory.

The glass fiber coating may also contain film forming materials known to those skilled in the art, which will stick the individual fibers into bundles to facilitate the handling of the fibers and blending them with the resin prior to melt mixing. These film forming ingredients impart good glass strand integrity on the fibers, i.e. resistance to forming "fuzz balls." Examples of film forming additives are starches, epoxy resins, polyvinyl acetate, unsaturated polyesters, polyurethane, polyvinyl pyrollidone, phenoxy resins, polyvinyl ether copolymers and the like. The preferred film formers are soluble in water or form stable emulsions, do not cause unfavorable interactions with the thermoplastic polyester, are stable under melt processing conditions and give fibers with good integrity.

It is also contemplated herein that the glass fiber treated with sizing agent be annealed. Annealing may be carried out in a conventional annealing oven, as known to those skilled in the art, at temperatures preferably from about 200° to about 500° F. for from about 1 to 5 hours.

In general, the best properties will be obtained if the sized filamentous glass reinforcement agent comprises from at least about 1 percent by weight, preferably, from about 1 to about 60 percent by weight, and most preferably from about 25 to about 40 percent by weight based on the total weight of the composition.

The polyester resin component can vary widely in amount. Preferably the polyester resin component is present in an amount ranging from about 99 to about 40 weight percent and more preferably from about 75 to about 50 weight percent based on the total weight of the composition. Where a blend of poly(ethylene terephthalate) and poly(1,4-butylene terephthalate) is employed, the polyester resin component will comprise from about 1 to about 99 parts by weight poly(ethylene terephthalate) and from about 99 to about 1 part by weight poly(1,4-butylene terephthalate) based on 100 parts by weight of the poly(ethylene terephthalate) and poly(1,4-butylene terephthalate) combined. However, other polyester blends are also contemplated within the scope of the present invention.

The compositions of the present invention can include, in addition to fibrous glass reinforcement of the type described, non-glass reinforcing fibers in combination therewith, such as mineral reinforcing fillers, e.g. talc, clay, silica, calcium silicate, mica, and the like.

Other ingredients, such as dyes, pigments, stabilizers, plasticizers, flame retardants, drip retardants and the like can be added for their conventionally employed purposes. Illustrative flame retardant additives are disclosed in U.S. Pat. Nos. 3,833,685; 3,341,154; 3,915,926 and 3,671,487. Other flame retardants are disclosed in U.S. Pat. Nos. 3,681,281; 3,557,053; 3,830,771 and United Kingdom Pat. No. 1,358,080.

Generally speaking, the more important of the flame retardant compounds contain chemical elements employed for their ability to impart flame resistance, e.g., bromine, chlorine, antimony, phosphorous and nitrogen. It is preferred that the flame-retardant additive comprise a halogenated organic compound (brominated or chlorinated); a halogenated-containing organic compound in admixture with a phosphorous compound or compounds containing phosphorous-nitrogen bonds or a mixture of two or more of the foregoing.

The amount of flame retardant additive used is not critical to the present invention, so long as it is present in a minor proportion based on said composition, major proportions will detract from physical properties, but at least sufficient to render the polyester resin non-burning or self-extinguishing. Those skilled in the art are well aware that the amount will vary with the nature of the resin and with the efficiency of the additive. In general, however, the amount of additive will be from 0.5 to 50 parts by weight per 100 parts of resin.

A preferred range will be from about 3 to 25 parts and an especially preferred range will be from about 8 to 12 parts of flame retardant additive per 100 parts of resin. Smaller amounts of compounds highly concentrated in the elements responsible for flame-retardance will be sufficient, e.g. elemental red phosphorous will be preferred at 0.5 to 2.0 parts by weight per hundred parts of resin, while phosphorous in the form of triphenyl phosphate will be used at 25 parts of phosphate per 100 parts of resin, and so forth. Halogenated aromatics will be used at 8 to 12 parts and synergists, e.g., antimony oxide, will be used at about 2 to 5 parts by weight per 100 parts of resin.

The preferred halogen compounds for this invention are aromatic halogen compounds such as brominated phthalimides, brominated polystyrene, brominated aryl ethers, halogenated bisphenols, polycarbonate polymers of halogenated bisphenols, brominated biphenyl, brominated terphenyl, or a compound comprising two phenyl radicals separated by a divalent alkylene or oxygen group and having at least two chlorine or bromine atoms per phenyl nucleus, and mixtures of at least two of the foregoing. Especially preferred are brominated phthalimides and polycarbonate oligomers of brominated bisphenols, alone, or mixed with antimony oxide.

In general, the preferred phosphate compounds are selected from elemental phosphorous or organic phosphonic acids, phosphonates, phosphinates, phosphonites, phosphinites, phosphene oxides, phosphenes, phosphites or phosphates. Illustrative is triphenyl phosphene oxide. This can be used alone, or mixed with brominated phthalimides or halogenated polycarbonates and, optionally, antimony oxide.

The compositions of the present invention may also comprise a drip retardant agent. These are described in U.S. Pat. No. 3,671,487. Generally, the drip retardant agent comprises a polytetrafluoroethylene resin, which is commercially available or can be prepared by known processes. They are white solids obtained by polymerization of the tetrafluoroethylene in aqueous media with free radical catalysts, e.g., sodium, potassium or ammonium peroxydisulfates at 100 to 1,000 psi and at 0°–200° C. and preferably 200°–100° C. See Brubaker, U.S. Pat. No. 2,393,967.

In a preferred embodiment the compositions of the present invention will additionally comprise a nucleating agent. Any conventional nucleating agent is suitable for the purposes of the present invention, such as sodium benzoate, aliphatic or aromatic carboxylic acid salts, oligomeric polyester salts, salts of acid containing polyolefin copolymers, polytetrafluoroethylene, talc or clay. Preferred are nucleating agents comprising salts of carboxylic acids. Most preferred are sodium benzoate, sodium stearate and polytetrafluoroethylene. The nucleating agent is preferably present in an amount of from about 0.1 to about 2.0 weight percent based on the total weight of the composition, although the addition of any effective amount is contemplated herein.

The compositions of the present invention can be prepared by a number of procedures. In one way, the reinforcing glass fibers (a glass roving or a bundle of strands of glass filaments) are treated with a sizing agent of the present invention, e.g., triglycidyl isocyanurate, to substantially coat the fibers and are chopped into small pieces, e.g., one-fourth to 2 inches in length. The treated chopped glass fibers, and optionally a mineral filler, are fed into an extrusion compounder with the polyester resin, and optional nucleating agent or other additive, to produce molding pellets. The reinforcing agent is thereby shortened and dispersed in a matrix of the resin coming out less than one-sixteenth of an inch long in the process. In another procedure, glass filaments are ground or milled to short lengths, treated with triglycidyl isocyanurate, and are then mixed with the polyester resin and optional nucleating agent by dry blending and then either fluxed on a mill and ground, or they are extruded and chopped. In still another procedure, continuous lengths of glass roving are pretreated with a triglycidyl isocyanurate sizing agent and then drawn through a bath of melted polyester resin, flame retardant additive and nucleating agent which thereby substantially coats the filaments and the resin coated treated glass strand is chopped into small cylinders, one-fourth inch or longer, to form a molding compound. The treated glass fibers can also be mixed with resin and additives and directly molded, e.g., by injection or transfer molding techniques.

It is always important to thoroughly free all of the components, resin, glass and flame retardant and other additives, from as much water as possible.

In addition, compounding should be carried out to ensure that the residence time in the machine is short, the temperature is carefully controlled, the friction heat is utilized; and an intimate blend between the resin and the reinforcement is obtained.

Although it is not essential, good results are obtained if the components are pre-compounded, pelletized and molded. Pre-compounding can be carried out in conventional equipment. For example, after carefully pre-drying the polyester resin, e.g., under vacuum at 100° C. for about 12 hours, a single screw extruder is fed with a dry blend of the components, the screw employed having a long transition section to ensure proper melting. On the other hand, a twin extrusion machine, e.g. a 28 mm Werner Pfleiderer machine can be fed with resin and additives at the feed port and the triglycidyl isocyanurate treated glass fiber reinforcing agent downstream.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, and conventional mold temperatures.

DESCRIPTION OF THE PREFERRED EMBODIMENTS

The following examples illustrate the present invention. They are not to be construed to limit the claims in any manner whatsoever. All compositional data are in weight percent unless otherwise indicated.

The following set of abbreviations in Table A are used in the following examples and Tables.

TABLE A

| GLASS FIBER DESCRIPTION | |
| --- | --- |
| OCF-408K = | Bisphenol A epoxy sizing on K filament E glass |
| OCF-408G = | Bisphenol A epoxy sizing on G filament E glass |
| OCF-408D = | Bisphenol A epoxy sizing on D filament E glass |
| OCF-S-408G = | Bisphenol A epoxy sizing on G filament S glass |
| OCF-TGIC-G = | TGIC with GAP (gamma aminopropyl triethoxy silane) on G filament E glass |
| OCF-TGIC-D = | TGIC with GAP on D filament E glass |
| K filament is about 14 micron diameter G filament is about 10 micron diameter. D filament is about 7 micron diameter. Actual samples will have a distribution of filament diameters. | |

EXAMPLE 1

A composition consisting of 69 weight percent of poly(1,4-cyclohexanedimethanol terephthalate) (PCT) is compounded with 30 weight percent of triglycidyl isocyanurate treated G glass, 0.5 weight percent of phosphite stabilizer Ultranox® 626 and 0.5 weight percent of phenolic antioxidant Irganox® 1010 on a 2.5 inch single screw extruder. The composition is molded into test bars and tested for strength characteristics according to ASTM methods. For comparison purposes, blends with standard K glass and standard G glass (Owens Corning Fiberglass OCF-408K and OCR-408G) are also tested. The results are set forth in Table 1 below.

TABLE 1
GLASS FILLED PCT BLENDS

| EXAMPLE | 1A* | 1B* | 1 |
|---|---|---|---|
| Composition (Weight Percent) | | | |
| PCT | 69.0 | 69.0 | 69.0 |
| OCF-408K | — | 30.0 | — |
| OCF-408G | 30.0 | — | — |
| OCF-TGIC-G | — | — | 30.0 |
| Ultranox ® 626$^b$ | 0.5 | 0.5 | 0.5 |
| Irganox ® 1010$^c$ | 0.5 | 0.5 | 0.5 |
| Properties | | | |
| Unnotched Izod, ft-lbs/in | 11.4 | 10.2 | 14.3 |
| Tensile Strength, Kpsi | 16.6 | 15.3 | 16.8 |
| Annealed$^a$, Kpsi | 18.3 | 14.6 | 20.2 |
| Flexural strength$^a$, Kpsi | 24.7 | 23.6 | 26.4 |

*Comparative Example
$^a$annealed in an oven at 160° C. for 24 hours
PCT = Poly(1,4-cyclohexanedimethanol terephthalic acid), Eastman PCT 3897
$^b$General Electric Specialty Chemicals
$^c$Ciba Geigy Company Table 1 above shows that the PCT resin containing the triglycidyl isocyanurate treated glass reinforcing agent exhibited superior strength characteristics than the blends with the standard glass reinforcing agents.

EXAMPLES 2-5

The procedure of Example 1 is repeated except that blends of poly(ethylene terephthalate) (PET) and poly(1,4-butylene terephthalate) (PBT) are employed as the polyester resin; and in some instances sodium benzoate is added to the mixture. No stabilizers are added to these blends. In these examples, E glass compositions of different filament diameters (K=14 micron and G=10 micron) are compared with a standard bisphenol A epoxy coating (408) and a TGIC containing coating. The samples are tested for various physical properties and the results are set forth in Table 2 below.

TABLE 2

| | 30% GLASS FIBER IN PET/PBT BLENDS | | | | | | | |
|---|---|---|---|---|---|---|---|---|
| Example | 2A* | 3A* | 2 | 3 | 4A* | 5A* | 4 | 5 |
| Composition (phr) | | | | | | | | |
| PBT 295 | 17.5 | 17.5 | 17.5 | 17.5 | 35.0 | 35.0 | 35.0 | 35.0 |
| PBT 315 | 17.5 | 17.5 | 17.5 | 17.5 | — | — | — | — |
| PET (MV 840) | 35.0 | 35.0 | 35.0 | 35.0 | 35.0 | 35.0 | 35.0 | 35.0 |
| NaBz | — | 0.1 | — | 0.1 | — | 0.1 | — | 0.1 |
| OCF 408K | 30.0 | 30.0 | — | — | — | — | — | — |
| OCF 408G | — | — | — | — | 30.0 | 30.0 | — | — |
| OCF TGIC G | — | — | 30.0 | 30.0 | — | — | 30.0 | 30.0 |
| Properties | | | | | | | | |
| Melt Viscosity$^a$ | 12,000 | 6,700 | 20,500 | 10,500 | 6,700 | 4,700 | 8,400 | 5,600 |
| Unnotched Izod$^b$ | 14.2 | 12.6 | 16.9 | 16.6 | 17.7 | 18.9 | 22.1 | 21.4 |
| Tensile Strength$^c$ | 17.0 | 18.2 | 19.2 | 20.7 | 21.5 | 23.2 | 22.7 | 24.3 |
| (Annealed)$^f$ | (19.1) | (20.1) | (22.5) | (22.9) | (23.3) | (23.2) | (24.8) | (24.3) |
| Flexural Strength$^d$ | 25.6 | 27.7 | 28.2 | 30.1 | 29.6 | 32.5 | 30.3 | 33.6 |
| (Annealed)$^f$ | (28.5) | (29.4) | (32.3) | (32.9) | (33.4) | (33.0) | (34.4) | (36.8) |
| Flexural Modulus$^e$ | 1110 | 1250 | 1130 | 1140 | 1220 | 1250 | 1180 | 1260 |
| (Annealed)$^f$ | (1120) | (1120) | (1030) | (1080) | (1300) | (1180) | (1140) | (1240) |

*Comparative Example
PBT 295 = Poly(1,4-butylene terephthalate), GE VALOX ® 295
PBT 315 = Poly(1,4-butylene terephthalate), GE VALOX ® 315
PET (MV 840) = Poly(ethylene terephthalate), ICI 5202A
NaBz = Sodium Benzoate
$^a$at 265° C. in poise
$^b$in ft. lbs/in according to ASTM D-56
$^c$in Kpsi according to ASTM D-638
$^d$in Kpsi according to ASTM D-790
$^e$in Kpsi according to ASTM D-790
$^f$4 hours at 250° F.
phr = parts per hundred Table 2 above demonstrates that the PBT-PET blends containing the triglycidyl isocyanurate treated glass reinforcing agent exhibited superior strength characteristics than the blends with the untreated glass reinforcing agent.

EXAMPLES 6-9

The procedure of Examples 2-5 is repeated except that the blends contain 35 weight percent of treated glass reinforcing agent. E Glass fibers of different diameters (K=14 micron, G=10 micron and D=7 micron) are compared with standard sizing for polyester resins (408) and TGIC containing coating. The samples are tested for physical properties and the results are set forth below in Table 3.

TABLE 3

| | 35% GLASS FIBER PET-PBT BLENDS | | | | | | |
|---|---|---|---|---|---|---|---|
| Example | 6A* | 6 | 7 | 8A* | 8 | 9A* | 9 |
| Composition | | | | | | | |
| PBT 295 | 32.5 | 32.5 | 32.5 | 32.5 | 32.5 | — | — |
| PBT 315 | — | — | — | — | — | 32.5 | 32.5 |
| PET (MV 830) | 32.5 | 32.5 | 32.5 | 32.5 | 32.5 | 32.5 | 32.5 |
| NaBz | 0.1 | 0.1 | 0.1 | 0.1 | 0.1 | 0.1 | 0.1 |
| OCF 408K | — | — | — | 35.0 | — | 35.0 | — |

TABLE 3-continued

| | 35% GLASS FIBER PET-PBT BLENDS | | | | | | |
|---|---|---|---|---|---|---|---|
| Example | 6A* | 6 | 7 | 8A* | 8 | 9A* | 9 |
| OCF 408D | 35.0 | — | — | — | — | — | — |
| OCF TGIC D | — | 35.0 | — | — | — | — | — |
| OCF TGIC G | — | — | 35.0 | — | 35.0 | — | 35.0 |
| Properties | | | | | | | |
| Melt Viscosity[a] | 8,000 | 9,900 | 7,100 | 4,000+ | — | 5,900+ | 12,200+ |
| Unnotched Izod[b] | 23.2 | 24.1 | 19.4 | 16.7 | 21.1 | 17.0 | 20.1 |
| Tensile Strength[c] | 24.1 | 24.8 | 26.2 | 22.0 | 23.8 | 20.8 | 24.3 |
| (Annealed)[f] | (25.4) | (26.7) | (27.2) | (23.3) | (25.5) | (23.8) | (25.5) |
| Flexural Strength[d] | 35.5 | 36.0 | 37.1 | 32.4 | 32.8 | 31.3 | 34.8 |
| (Annealed)[f] | (37.6) | (39.0) | (39.4) | (34.5) | (38.2) | (34.2) | (38.8) |
| Flexural Modulus[e] | 1420 | 1040 | 1370 | 1370 | 1370 | 1330 | 1360 |
| (Annealed)[f] | (1430) | (1420) | (1380) | (1380) | (1400) | (1430) | (1470) |

*Comparative Example
PBT 295 = Poly(1,4-butylene terephthalate), GE VALOX ® 295
PBT 315 = Poly(1,4-butylene terephthalate), GE VALOX ® 315
PET (MV 830) = Poly(ethylene terephthalate), ICI 5202A
NaBz = Sodium Benzoate
[a] at 265° C. in poise
[b] in ft. lbs/in according to ASTM D-56
[c] in Kpsi according to ASTM D-638
[d] in Kpsi according to ASTM D-790
[e] in Kpsi according to ASTM D-790
[f] 4 hours at 250° F.
+ melt viscosity at 250° F.

Table 3 above demonstrates that PET-PBT blends containing TGIC treated glass fibers exhibit superior strength characteristics than non-TGIC treated glass fiber at 35 weight percent glass fiber contents.

EXAMPLES 10-11

The procedure of Example 1 is followed except the polyester resin is poly(ethylene terephthalate) alone. Samples are tested for physical strength properties and the results are set forth in Table 4 below.

TABLE 4

| | GLASS FIBER PET COMPOSITIONS | | | | | |
|---|---|---|---|---|---|---|
| Example | 10A* | 10B* | 10 | 11A* | 11B* | 11 |
| Composition | | | | | | |
| PET (MV 850) | 70.0 | 70.0 | 70.0 | 70.0 | 70.0 | 70.0 |
| NaBz | — | — | — | 0.1 | 0.1 | 0.1 |
| OCF 408K | — | 30.0 | — | — | 30.0 | — |
| OCF 408G | 30.0 | — | — | 30.0 | — | — |
| OCF TGIC G | — | — | 30.0 | — | — | 30.0 |
| Properties | | | | | | |
| Melt Viscosity[a] | 4,300 | 6,300 | 6,900 | 4,100 | 4,500 | 6,600 |
| Unnotched Izod[b] | 17.7 | 12.1 | 19.2 | 15.4 | 8.6 | 17.5 |
| Tensile Stength[c] | 22.3 | 19.8 | 22.8 | 21.4 | 21.7 | 23.1 |
| (Annealed)[f] | (23.8) | (22.2) | (25.2) | (21.0) | (21.9) | (22.9) |
| Flexural Strength[d] | 32.1 | 29.5 | 33.4 | 33.7 | 32.2 | 35.5 |
| (Annealed)[f] | (33.7) | (32.1) | (36.4) | (31.6) | (32.2) | — |
| Flexural Modulus[e] | 1200 | 1290 | 1270 | 1200 | 1120 | 1190 |
| (Annealed)[f] | (1330) | (1150) | (1310) | (1300) | (1300) | — |

*Comparative Example
PET (MV 850) = Poly(ethylene terephthalate), ICI 5202A
NaBz = Sodium Benzoate
[a] in poise at 265° C.
[b] in Kpsi according to ASTM D-56
[c] in Kpsi according to ASTM D-638
[d] in Kpsi according to ASTM D-790
[e] in Kpsi according to ASTM D-790
[f] at 250° F. for 4 hours Table 4 above demonstrates that PET resins containing TGIC treated glass fibers exhibit superior strength characteristics than non-TGIC treated glass fibers.

EXAMPLES 12-13

The procedure of Example 1 is repeated except comparison is made on PBT resins treated with 30 weight percent glass fibers and varying the sizing agent. Samples are tested for physical properties and the results are set forth below in Table 5.

TABLE 5

| PHYSICAL PROPERTIES VARYING SIZING AGENT | | | | | |
|---|---|---|---|---|---|
| Example | 12A* | 12B* | 12 | 13A* | 13 |
| Composition | | | | | |
| PBT | 70 | 70 | 70 | 70 | 70 |
| GF | 30 | 30 | 30 | 30.1 | 30.1 |
| SA | E | N | T | N+ | T+ |
| Properties | | | | | |
| Tensile Strength[a] | 18.5 | 20.2 | 21.6 | 20.4 | 22.1 |
| Flexural Strength[b] | 28.4 | 31.7 | 33.2 | 32.1 | 34.6 |
| Flexural Modulus[c] | 1150 | 1170 | 1220 | 1250 | 1310 |
| Notched Izod[d] | 1.65 | 1.85 | 1.94 | 1.91 | 2.01 |
| Unnotched | 14.8 | 20.5 | 21.1 | 21.4 | 22.1 |

TABLE 5-continued
PHYSICAL PROPERTIES VARYING SIZING AGENT

| Example | 12A* | 12B* | 12 | 13A* | 13 |
|---|---|---|---|---|---|
| Izod[e] | | | | | |

*Comparative Example
PBT = Poly(butylene terephthalate)
GF = ⅛ inch G-filament (8-10 microns diameter) E-glass fiber
SA = Sizing Agent coupled to glass fibers with an amino propyltrialkoxysilane
E = Bifunctional Epoxide Resin (bisphenol-A chemistry)
N = Novolac (multifunctional) Epoxide Resin (cresol chemistry)
T = Triglycidyl isocyanurate
+ = 0.1 percent sodium benzoate added
[a] in Kpsi according to ASTM D-638
[b] in Kpsi according to ASTM D-790
[c] in Kpsi according to ASTM D-790
[d] in ft lbs/in according to ASTM
[e] in ft lbs/in according to ASTM D-56

EXAMPLES 14-17

The procedure of Example 1 is repeated except comparison is made on PBT resins treated with 35 and 40 weight percent of glass fibers and varying the sizing agent. A standard epoxy sizing OCF-408 is compared to a TGIC containing sizing OCF-TGIC. Samples are tested for physical properties and the results are set forth in Table 6 below.

TABLE 6
FILAMENT DIAMETER EFFECTS WITH AND WITHOUT TGIC COATING

| Example | 14A* | 14 | 15A* | 15 | 16A* | 16 | 17A* | 17 |
|---|---|---|---|---|---|---|---|---|
| Composition | | | | | | | | |
| PBT 295 | 65.0 | 65.0 | 65.0 | 65.0 | 60.0 | 60.0 | 65.0 | 65.0 |
| NaBz | 0.1 | 0.1 | 0.1 | 0.1 | 0.1 | 0.1 | — | — |
| OCF-408G | 35.0 | — | — | — | 40.0 | — | 35.0 | — |
| OCF-TGIC-G | — | 35.0 | — | — | — | 40.0 | — | 35.0 |
| OCF-408D | — | — | 35.0 | — | — | — | — | — |
| OCF-TGIC-D | — | — | — | 35.0 | — | — | — | — |
| Properties | | | | | | | | |
| Un. Izod, ft-lbs/in | 16.9 | 18.6 | 17.5 | 20.0 | 18.7 | 20.9 | 14.6 | 17.8 |
| Tens. Str., Kpsi | 23.0 | 24.3 | 23.7 | 25.3 | 23.6 | 24.9 | 21.9 | 23.2 |
| Flex. Str., | 33.6 | 35.8 | 34.1 | 36.9 | 35.3 | 38.5 | 32.7 | 34.0 |

*Comparative Example
PBT 295 = GE Plastics Valox ® 295
NaBz = Sodium Benzoate

EXAMPLE 18

The procedure of Example 1 is repeated except comparison is made on PBT resins treated with 30 weight percent "strong glass" fibers and varying the sizing agent. "Strong glass" differs in chemical composition from the "E" glass employed in the other examples. The resultant glass fiber has higher tensile strength then E glass. Samples of PBT with TGIC coated "strong glass" (OCF-S-TGIC-G) are tested for physical properties and compared to a "strong glass" with an epoxy sizing (OCF-S-408G) and an E glass with an epoxy sizing (OCF-408G). Results are shown in Table 7 below.

TABLE 7
S-GLASS BLENDS WITH PBT

| Example | 18A* | 18B* | 18 |
|---|---|---|---|
| Composition | | | |
| PBT 295 | 70.0 | 70.0 | 70.0 |
| OCF-408G | 30.0 | — | — |
| OCF-S-408G | — | 30.0 | — |
| OCT-S-TGIC-G | — | — | 30.0 |
| Properties | | | |
| Unnotched Izod, ft-lbs/in | 18.0 | 17.2 | 21.4 |
| Tensile Str., Kpsi | 21.7 | 22.6 | 24.6 |
| Flexural Str., Kpsi | 32.1 | 33.4 | 36.6 |

*Comparative Example
PBT 295 = GE Plastics Valox ® 295

EXAMPLES 19-20

The procedure of Example 1 is repeated except employing a poly(butylene terephthalate) as the polyester resin and adding a flame retardant to the composition. Samples are tested for physical characteristics and the results are set forth in Table 8 below.

TABLE 8
FLAME RETARDANT BLENDS

| EXAMPLE | 20A* | 20B* | 20 | 21A* | 21 |
|---|---|---|---|---|---|
| Composition | | | | | |
| PBT | 55 | 55 | 55 | 55 | 55 |
| OCF-408K | 30 | — | — | — | — |
| OCF-408G | — | 30 | — | — | — |
| OCF-408D | — | — | — | 30 | — |
| OCF-TGIC-G | — | — | 30 | — | — |
| OCF-TGIC-D | — | — | — | — | 30 |
| BrPC | 8.8 | 8.8 | 8.8 | 8.8 | 8.8 |
| Sb$_2$O$_3$ | 2.6 | 2.6 | 2.6 | 2.6 | 2.6 |
| Stablizers[d] | 3.6 | 3.6 | 3.6 | 3.6 | 3.6 |
| Properties | | | | | |
| Unnotched Izod[a] | 13.3 | 15.5 | 16.6 | 15.0 | 16.9 |
| Tensile Strength[b] | 17.8 | 19.9 | 20.6 | 20.7 | 21.5 |
| Flexural Strength[c] | 25.9 | 29.3 | 29.7 | 30.1 | 32.1 |

*Comparative Example
PBT = Poly(butylene terephthalate), General Electric Company (Valox ® 295)
[a] in ft lbs/in according to ASTM D-56
[b] in Kpsi according to ASTM D-638
[c] in Kpsi according to ASTM D-790
BrPC = Brominated Polycarbonate
Sb$_2$O$_3$ = Antimony oxide
[d] includes process aids Table 8 above demonstrates improved tensile, flexural and impact strength in flame retardant polyester compositions blended with TGIC-treated glass fibers. Both the comparative and TGIC treated glass fiber blends showed similar flame resistance in tests performed in accordance with Underwriters Laboratory 94.

The above-mentioned patents and Test Methods are hearby incorporated by reference.

Many variations of the present invention will suggest themselves to those skilled in this art in light of the above detailed description. For example, instead of triglycidyl isocyanurate; a diglycidyl isocyanurate, a triglycidyl cyanurate or other di- or tri-functional isocyanurate or cyanurate may be employed as the sizing agent. The sizing agent may also include a variety of coupling agents such as silane functional groups. The glass fibers may comprise E glass or strong "S" glass or any other known fiberizable glass composition. It is further contemplated to employ a variety of film formers with the sizing agent, for example, phenoxy resins, polyvinyl acetate, polyurethane, polyvinylether copolymers and the like. Additionally, any polyester resin or blends of polyester resins may be used in the present invention. It is also contemplated to employ drip retardants such as polytetrafluoroethylene in the compositions of the present invention, as well as numerous flame retardants, nucleating agents, and other commercial additives. All such obvious modifications are within the full intended scope of the appended claims.

We claim:

1. A thermoplastic resin composition comprising:
   (a) a polyester resin; and
   (b) a glass fiber reinforcing agent treated with a sizing agent comprising a di- or tri-functional cyanurate or isocyanurate, wherein the functionality comprises functional groups capable of chemically bonding to said polyester resin.

2. A composition as defined in claim 1 wherein said component (a) polyester resin comprises units of an aliphatic diol, a cycloaliphatic diol, or a mixture of such diols and an aromatic diacid.

3. A composition as defined in claim 2 wherein said component (a) polyester resin consists essentially of a poly(1,4-butylene terephthalate).

4. A composition as defined in claim 2 wherein said component (a) polyester resin consists essentially of a poly(ethylene terephthalate).

5. A composition as defined in claim 2 wherein said component (a) polyester resin consists essentially of a mixture of poly(1,4-butylene terephthalate) and poly(ethylene terephthalate).

6. A composition as defined in claim 1 wherein said component (a) polyester resin consists essentially of a poly(1,4-cyclohexanedimethanol terephthalate).

7. A composition as defined in claim 1 wherein said component (a) polyester resin has an intrinsic viscosity of at least about 0.4 deciliters per gram when measured in a 60:40 mixture of phenol and trichloroethane at 30° C.

8. A composition as defined in claim 1 wherein said component (b) glass fiber reinforcing agent comprises glass fibers having filament lengths of from about 0.000005 to about 0.125 inch and diameters ranging from about 5 to about 15 microns.

9. A composition as defined in claim 1 wherein said component (b) glass fiber reinforcing agent is present in an amount of from about 1 to about 60 weight percent based on the total weight of said composition.

10. A composition as defined in claim 9 wherein said component (b) glass fiber reinforcing agent is present in an amount ranging from about 25 to about 40 weight percent based on the total weight of said composition.

11. A composition as defined in claim 1 wherein said di- or tri-functional cyanurate or isocyanurate consists essentially of triglycidyl isocyanurate.

12. A composition as defined in claim 1 wherein said di- or tri-functional cyanurate or isocyanurate is present in an amount of from about 0.1 to about 2.0 weight percent based on the weight of the component (b).

13. A composition as defined in claim 1 wherein said sizing agent also comprises functionalized silane compounds.

14. A composition as defined in claim 13 wherein said functionalized silane compounds comprise epoxy, amine, mercapto or ureido functionalized alkoxy silanes.

15. A composition as defined in claim 14 wherein said silane compound is selected from the group consisting essentially of aminopropyl triethoxy silane, aminoethyl aminopropyl ethoxysilane or a mixture of any of the foregoing.

16. A composition as defined in claim 15 wherein said silane compound is selected from the group consisting essentially of glycidylpropyl triethoxy silane, (3,4-epoxycyclohexyl)ethyl triethoxysilane or a mixture of any of the foregoing.

17. A composition as defined in claim 1 wherein said sizing agent also comprises a film forming agent.

18. A composition as defined in claim 1 wherein said film forming agent comprises a phenoxy resin.

19. A composition as defined in claim 1 wherein said component (b) glass fiber reinforcing agent is annealed.

20. A composition as defined in claim 1 wherein said component (a) polyester resin is present in an amount ranging from about 99 to about 40 weight percent based on the total weight of said composition.

21. A composition as defined in claim 20 wherein said component (a) polyester resin is present in an amount ranging from about 75 to about 50 weight percent based on the total weight of said composition.

22. A composition as defined in claim 1 which also comprises (c) an effective amount of a nucleating agent.

23. A composition as defined in claim 22 wherein said effective amount of a nucleating agent comprises sodium benzoate or salts of aliphatic or aromatic carboxylic acids in an amount of from about 0.1 to about 1.0 weight percent based on the total weight of said composition.

24. A composition as defined in claim 1 which also comprises (d) an effective amount of a flame retardant agent.

25. A composition as defined in claim 24 wherein said component (d) flame retardant agent is selected from the group consisting of a halogen-containing compound, a halogen-containing compound in admixture with a synergist, elemental phosphorous or a phosphorous compound, a halogen-containing compound in admixture with a phosphorous, and mixtures of any of the foregoing; wherein said flame retardant is present in an amount of from 0.5 to 50 parts by weight per 100 parts by weight of polyester resin.

26. A composition as defined in claim 25 wherein said halogen-containing compound in admixture with a synergist comprises brominated polycarbonate in admixture with antimony oxide.

27. A composition as defined in claim 25 wherein said halogen-containing compound in admixture with a synergist comprises brominated phthalimide in admixture with antimony oxide.

28. A composition as defined in claim 1 wherein said composition also comprises (e) a drip retardant agent.

29. A composition as defined in claim 1 wherein said composition also comprises components (c) and (d).

30. A composition as defined in claim 1 wherein said composition also comprises components (c), (d) and (e).

31. A thermoplastic resin composition consisting essentially of
(a) a polyester resin; and
(b) a glass fiber reinforcing agent treated with a sizing agent comprising a di- or tri-functional cyanurate or isocyanurate.

32. A thermoplastic resin composition comprising:
(a) a polyester resin; and
(b) a glass fiber reinforcing agent treated with a sizing agent comprising a di- or tri-epoxy functional cyanurate or isocyanurate.

33. A thermoplastic resin composition comprising:
(a) a polyester resin; and
(b) a glass fiber reinforcing agent treated with a sizing agent comprising a di- or tri-epoxy functional cyanurate or isocyanurate, wherein said epoxy functional groups are selected from the group consisting of glycidyl, epoxy propyl and epoxy cyclohexyl.

* * * * *